(No Model.)
F. M. FARRELL.
GATE.
No. 367,710. Patented Aug. 2, 1887.
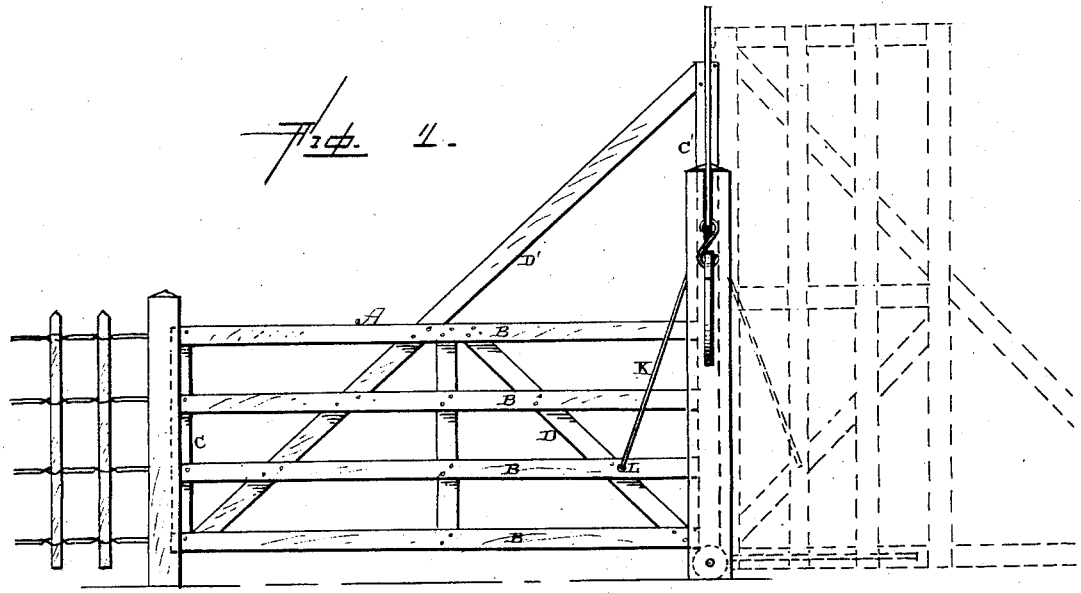
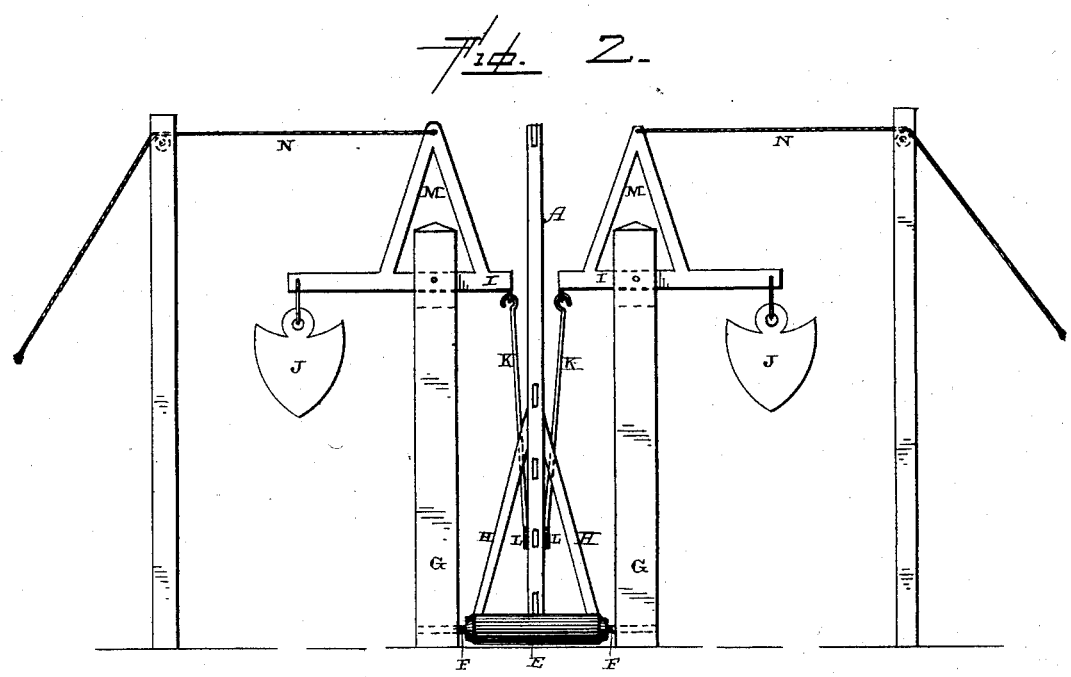
Witnesses.
L. F. Gardner
Edm. P. Ellis,
Inventor.
F. M. Farrell,
per F. A. Lehmann,
atty.

UNITED STATES PATENT OFFICE.

FRANK M. FARRELL, OF COBDEN, ILLINOIS.

GATE.

SPECIFICATION forming part of Letters Patent No. 367,710, dated August 2, 1887.

Application filed May 18, 1887. Serial No. 238,665. (No model.)

*To all whom it may concern:*

Be it known that I, FRANK M. FARRELL, of Cobden, in the county of Union and State of Illinois, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates, and has relation to that class of gates which are pivoted to swing in a vertical plane across the roadway; and the invention consists in the peculiar construction and arrangement of parts, as hereinafter fully described, and pointed out in the claim.

Figure 1 is a side elevation of my improved gate, shown open in dotted lines and closed in solid lines. Fig. 2 is an end view.

Similar reference-letters indicate corresponding parts in both figures.

Referring to the drawings by letter, A represents the gate, composed of the slats B, the uprights C C', and the braces D D'. The rear upright, C', is of heavier material than the other uprights, and extends some distance above the top of the gate, as shown, for a purpose hereinafter described, and the brace D' is extended up to the said upright and secured thereto. To the lower end of the upright C' is secured the bar E, which is provided with trunnions F, working in holes in the posts G. For strengthening the connection between the upright C' and bar E, braces H extend from the ends of the bar to opposite sides of the upright. In the slotted upper ends of the posts G are pivoted the levers I, from the outer ends of which are suspended the weights J. To the inner ends of the levers I rods or chains K are pivoted, the lower ends of which are pivoted to the gate at L. Projecting upwardly from the levers I are two bars, M, which are secured together at their upper ends and have the cords or wires N attached to them. The cords or wires N extend to posts on the side of the roadway, so that they can be conveniently reached by the occupant of a vehicle or any one on horseback.

A gate constructed as above described can be readily operated by pulling on the cords or wires N, which will throw the gate to the position shown in dotted lines in Fig. 1, when by operating the cord N on the opposite side the gate will be returned to its normal position. The extended upright C' forms a balance for the gate, and, together with the weights on the levers, causes it to operate easily and prevents it from turning too rapidly and striking the ground with great force. Although I have shown the gate composed entirely of slats, yet a gate composed partly of slats and partly of wire or other suitable material may be used, if desired.

Having thus described my invention, what I claim, and desire to secure by Letters Patent, is—

The combination, with the posts G and the gate A, provided with the upwardly-projecting rear upright, C', and the bar E, having trunnions at its ends, of the levers I, pivoted to the posts G, and provided with the bars M, the ropes or wires N, attached to said bars, the weights suspended from the levers I, and the rods or chains K, pivoted to the inner ends of the said levers and to the gate, substantially as herein shown and described.

In testimony whereof I affix my signature in presence of two witnesses.

FRANK M. FARRELL.

Witnesses:
CHARLES T. FARRELL,
SAMUEL BOTKIN.